(12) United States Patent
Miller et al.

(10) Patent No.: US 9,313,383 B2
(45) Date of Patent: Apr. 12, 2016

(54) SYSTEM, DEVICE AND METHOD FOR CAPTURING AN IMAGE OF MULTIPLE VIEWS OF AN OBJECT

(71) Applicant: Lockmasters Security Institute, Inc., Nicholasville, KY (US)

(72) Inventors: J. Clayton Miller, Nicholasville, KY (US); Benjamin Gallup, Cambridge, MA (US); Grant Jordan, San Diego, CA (US); Justin D. Seacat, Lexington, KY (US); Brian Weinberg, San Diego, CA (US); Michael S. Yacobi, Lexington, KY (US)

(73) Assignee: Lockmasters Security Institute, Inc., Nicholasville, KY (US)

( * ) Notice: Subject to any disclaimer, the term of this patent is extended or adjusted under 35 U.S.C. 154(b) by 248 days.

(21) Appl. No.: 13/833,313

(22) Filed: Mar. 15, 2013

(65) Prior Publication Data
US 2014/0260809 A1    Sep. 18, 2014

(51) Int. Cl.
| | |
|---|---|
| *G06K 7/00* | (2006.01) |
| *G06K 9/20* | (2006.01) |
| *H04N 5/225* | (2006.01) |
| *G06K 15/00* | (2006.01) |

(52) U.S. Cl.
CPC ............ *H04N 5/2254* (2013.01); *G06K 9/2036* (2013.01); *G06K 9/209* (2013.01); *G06K 15/00* (2013.01)

(58) Field of Classification Search
CPC ................................ G06K 15/00; G06K 9/209
See application file for complete search history.

(56) References Cited

U.S. PATENT DOCUMENTS

| | | | | |
|---|---|---|---|---|
| 3,611,569 A | | 10/1971 | Wich | |
| 4,780,032 A | * | 10/1988 | Uyeda et al. | .................... 409/82 |
| 5,908,273 A | | 6/1999 | Titus et al. | |
| 5,975,710 A | | 11/1999 | Luster | |
| 6,064,747 A | * | 5/2000 | Wills et al. | .................... 382/100 |

(Continued)

FOREIGN PATENT DOCUMENTS

| | | |
|---|---|---|
| CH | 703485 A1 | 1/2012 |
| CN | 102333660 A | 1/2012 |

(Continued)

OTHER PUBLICATIONS

U.S. Patent and Trademark Office, Internatinoal Search Report and Written Opinion in PCT Application No. PCT/US14/25661, Aug. 11, 2014.

(Continued)

*Primary Examiner* — Stephen R Koziol
*Assistant Examiner* — Jonathan S Lee
(74) *Attorney, Agent, or Firm* — Wood, Herron & Evans, LLP

(57) ABSTRACT

A device for capturing at least three views of an object with a camera includes a housing having a cavity. A slot in the housing communicates with the cavity and is adapted to accept an object. A plurality of mirrors in the cavity reflects at least three views of the object towards the camera, allowing the camera to capture an image of the views. A system for capturing multiple views of an object includes a housing having a cavity. A slot in the housing communicates with the cavity and is adapted to receive an object. A camera, a light source, and a plurality of mirrors in the cavity reflect at least three views of the object towards the camera, allowing the camera to capture an image three views.

66 Claims, 15 Drawing Sheets

(56) References Cited

U.S. PATENT DOCUMENTS

| | | |
|---|---|---|
| 6,406,227 B1 | 6/2002 | Titus et al. |
| 6,449,381 B1 * | 9/2002 | Yanovsky ............ G06K 9/2036 382/100 |
| 6,647,308 B1 | 11/2003 | Prejean |
| 6,836,553 B2 | 12/2004 | Campbell et al. |
| 6,895,100 B1 | 5/2005 | Pacenzia et al. |
| 6,978,939 B2 | 12/2005 | Russell et al. |
| 7,911,655 B2 | 3/2011 | Hatzav et al. |
| 7,967,513 B2 | 6/2011 | Zhang |
| 7,995,140 B2 | 8/2011 | Boutant |
| 8,056,805 B2 | 11/2011 | Wolf, II |
| 8,059,883 B1 | 11/2011 | Watts |
| 8,235,291 B2 | 8/2012 | Wolf |
| 8,634,655 B2 | 1/2014 | Thompson et al. |
| 8,644,619 B2 | 2/2014 | Thompson et al. |
| 2002/0031251 A1 | 3/2002 | Campbell et al. |
| 2004/0253067 A1 | 12/2004 | Bosch |
| 2007/0224008 A1 | 9/2007 | Bass et al. |
| 2009/0180664 A1 | 7/2009 | Efstathiades et al. |
| 2010/0278437 A1 * | 11/2010 | Thompson et al. ........... 382/209 |
| 2010/0316250 A1 | 12/2010 | Perrigo |
| 2011/0297691 A1 | 12/2011 | Freeman |
| 2012/0093564 A1 | 4/2012 | Bosch |
| 2013/0063654 A1 | 3/2013 | Spielfogel |
| 2014/0064597 A1 * | 3/2014 | Fagan et al. ................... 382/141 |
| 2014/0140628 A1 | 5/2014 | Thompson et al. |

FOREIGN PATENT DOCUMENTS

| | | |
|---|---|---|
| DE | 102005027102 A1 | 12/2006 |
| EP | 0556590 A1 | 8/1993 |
| EP | 1468769 A1 | 10/2004 |
| EP | 2396179 A1 | 12/2011 |
| WO | WO 2008071619 A1 * | 6/2008 |

OTHER PUBLICATIONS

U.S. Patent and Trademark Office, Internatinoal Preliminary Report on Patentability in PCT Application No. PCT/US14/25661, Mar. 26, 2015.

U.S. Patent and Trademark Office, Office Action in U.S. Appl. No. 14/154,500, Jun. 4, 2015.

European Patent Office, European Search Report in EP Application No. 15151135, Jun. 19, 2015.

* cited by examiner

SYSTEM, DEVICE AND METHOD FOR CAPTURING AN IMAGE OF MULTIPLE VIEWS OF AN OBJECT

FIELD OF THE INVENTION

The invention relates generally to capturing an image of multiple views of an object, and more specifically, capturing an image of multiple views of an object in order to produce a copy of the object.

BACKGROUND OF THE INVENTION

Generally, in order to make a copy of an object, such as a key, a user must physically possess the key and transport the key to a location having a device which is operable to reproduce the key. Alternatively, there are devices in the prior art which allow a user to impress the shape and configuration of the key in order to create a mold. The mold is then used to reproduce the key. These devices, however, may be unreliable and may not be feasible where the shape and configuration of several keys must be acquired quickly and in a covert manner. Similarly, in those situations, it may be infeasible to remove a key, of which a copy is desired, from its home environment, for various reasons. Therefore, there is a need in the art for a system which allows a user to acquire the shape and configuration of a key quickly, for the purposes of copying the key, without transporting the key from its home environment.

SUMMARY OF THE INVENTION

In one embodiment, a device for capturing at least three views of an object with a camera is provided and comprises a housing having a cavity and a slot in the housing communicating with the cavity and adapted to accept an object. There is a plurality of mirrors in the cavity configured to reflect at least three views of the object towards the camera, thereby allowing the camera to capture an image of the at least three views. In one embodiment, the device is configured to be portable and hand-held.

In another embodiment, a device for capturing a plurality of views of an object with a camera is provided and comprises a housing having a cavity and a plurality of mirrors in the cavity configured to reflect a plurality of views of the object towards the camera, thereby allowing the camera to capture an image of the plurality of views. The device further comprises a slot in the housing communicating with the cavity and adapted to accept an object, wherein the housing comprises an adjustable portion to stabilize the object when at least part of the object is directed into the slot.

In another embodiment, a system for capturing multiple views of an object is provided and comprises a housing having a cavity and a slot in the housing communicating with the cavity and adapted to receive an object. The system further includes a camera, a light source, and a plurality of mirrors in the cavity configured to reflect at least three views of the object towards the camera, thereby allowing the camera to capture an image of the at least three views.

In another embodiment, a system for capturing multiple views of an object is provided and comprises a housing having a cavity and a slot in the housing communicating with the cavity and adapted to receive an object. The system further comprises an adjustable portion to stabilize the object when the object is directed into the slot. The system further comprises a camera, a light source, and a plurality of mirrors in the housing configured to reflect a plurality of views of the object towards the camera, thereby allowing the camera to capture an image of the plurality of views.

A method of capturing multiple views of an object using a housing is provided. The housing comprises a cavity, the cavity including a plurality of mirrors therein. The method comprises receiving at least a portion of the object into the cavity. The method further comprises reflecting an image with the plurality of mirrors towards a camera communicating with the cavity, the image comprising at least three views of the object, and capturing the image with the camera.

Another method of capturing multiple views of an object using a housing is provided. The housing comprises a cavity, the cavity including a plurality of mirrors therein. The method comprises receiving at least a portion of the object into a slot communicating with the cavity, wherein a portion of a slot is adjustable to stabilize the object in the slot. The method further comprises reflecting an image towards a camera with the plurality of mirrors, the image comprising a plurality of views of the object. The method further comprises capturing the image with the camera.

A method of reproducing a key using a camera phone is provided and comprises capturing an image of a plurality of views of the key and transforming the image into data representing the image using software in the camera phone. The method further comprises sending the data to first and second machining devices. The method further comprises machining a key blank corresponding with the key using the first machining device, and machining the key blank with the second manufacturing device to reproduce a copy of the key.

A system for reproducing a key is provided and comprises a housing having a cavity and a slot in the housing communicating with the cavity and adapted to receive at least a portion of the key. The system further comprises a plurality of mirrors in the cavity configured to reflect a plurality of views of the object towards an aperture in the housing. The system further includes a camera phone, which further comprises a camera communicating with the aperture operative to capture an image of the plurality of views, a storage device operative to store the image captured by the camera, and software communicating with storage device and adapted to transform the image into data representing the image. The system further comprises a first key manufacturing device communicating with the camera phone to receive the data, the data useable by the first key manufacturing device to produce a key blank. The system further comprises a second key manufacturing device communicating the camera phone to receive the data, the data useable by the second key manufacturing device to produce a copy of the key from the key blank.

DETAILED DESCRIPTION OF THE DRAWINGS

Figure 1:
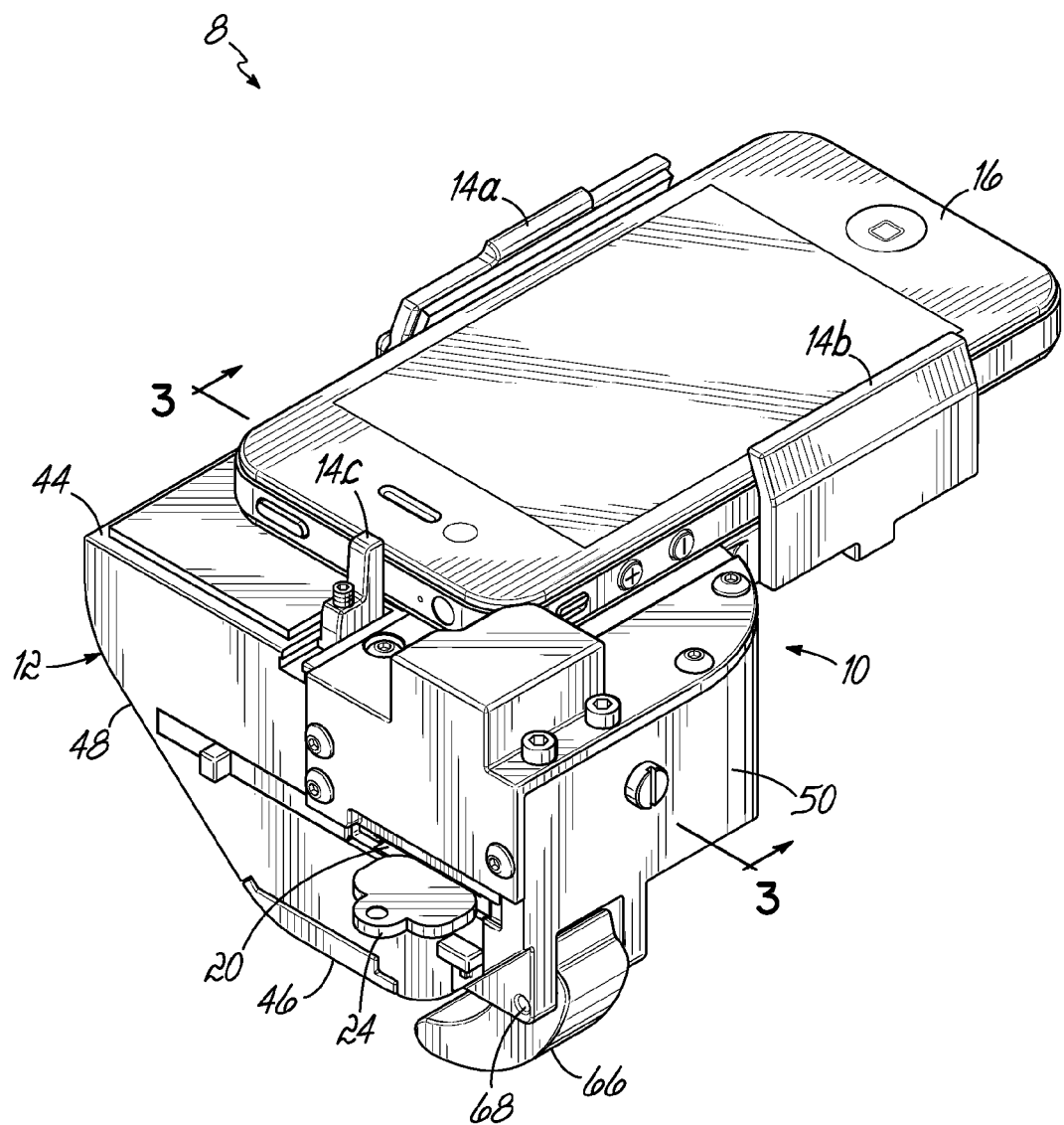
FIG. 1 shows a perspective view of one embodiment of a system for capturing multiple views of an object.
Figure 2:
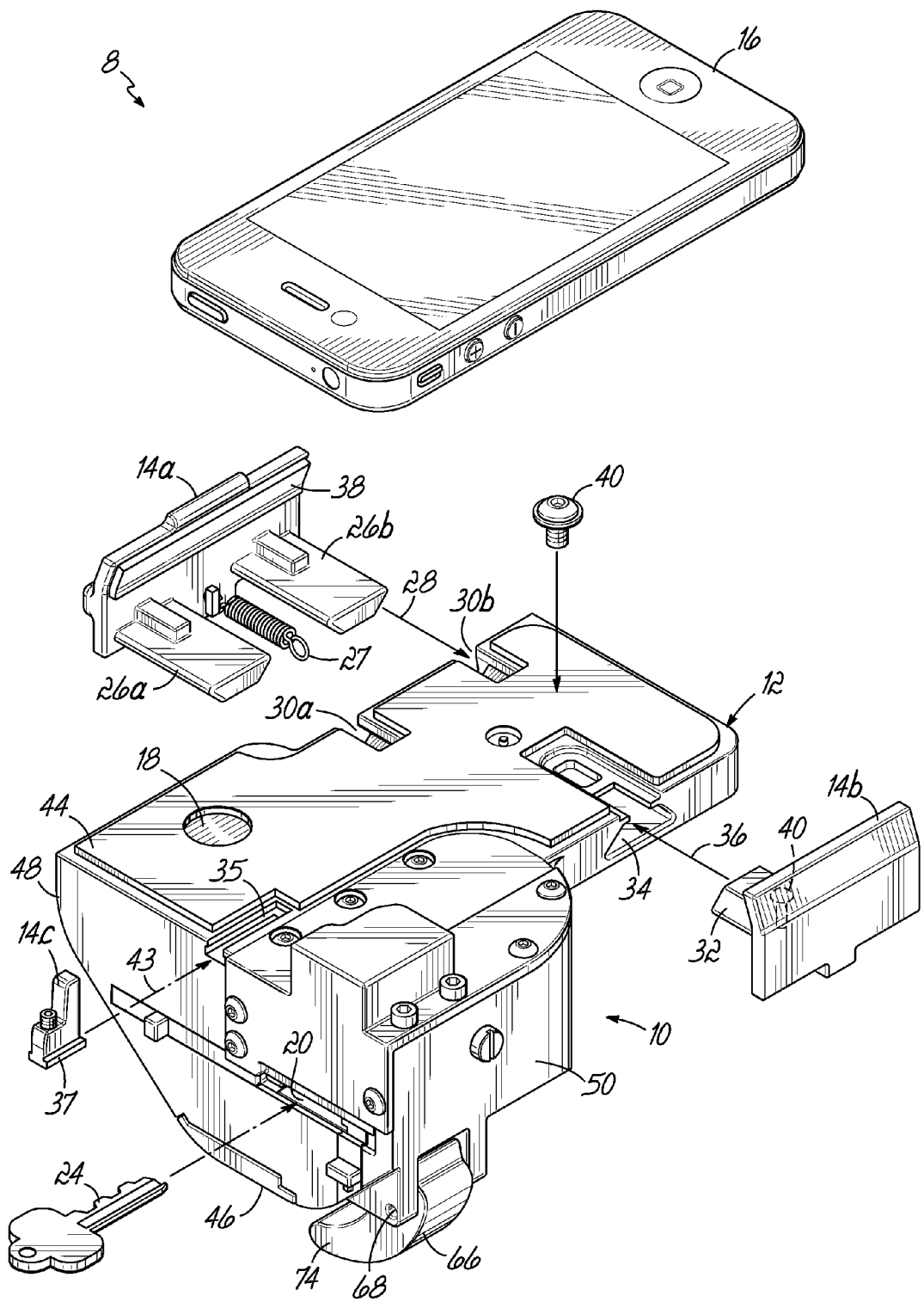
FIG. 2 shows an exploded perspective view of the embodiment of FIG. 1 showing components in more detail.

As shown in FIG. 1, the system 8 for capturing multiple views of an object includes a device 10 comprising a housing 12. The housing 12 includes retention members 14a, 14b, 14c adapted to couple a camera adjacent the housing 12. In the embodiment shown in FIG. 1, the retention members 14a, 14b, 14c are adjustable to align a lens 17 (FIG. 3B) of a camera phone with an aperture 18 (FIG. 2) in the housing 12. Retention members 14a, 14b, 14c allow for the housing 12 to accept a wide range of cameras and camera phones 16 to be used with the device. The system further comprises a camera. In the embodiment shown in FIG. 1, the camera comprises a camera phone 16. However, in other embodiments, the camera may be a stand-alone camera well known in the art. The device 10 includes a slot 20 in the housing 12. The slot 20 communicates with the cavity 22 (FIGS. 3A-B) and is adapted to receive an object. In the embodiment shown in FIG. 1, the object received by the slot 20 is a key 24. In other embodiments, however, the object may comprise other objects where copying an image thereof is beneficial, such as a credit card.

Retention member 14a includes two male members 26a, 26b which are slidably received within corresponding female portions 30a, 30b in the housing 12. Retention member 14a is moveable in the direction of arrow 28 in order to secure a camera relative to the housing 12. Similarly, retention member 14b includes a male member 32 which is slidably receivable into a female portion 34 of the housing 12 in the direction of arrow 36 in order to secure a camera relative to the housing 12. Still similarly, retention member 14c includes a male member 37 which is slidably receivable into another female portion 35 of the housing 12 in the direction of arrow 43 in order to secure a camera relative to the housing 12. The positions of the male members 26a, 26b, 32, 37 of the retention members 14a, 14b, 14c within the female portions 30, 34, 35 of the housing 12 depends on the size of the camera or camera phone being secured relative to the housing 12. Spring 27 couples with the housing 12 and biases retention member 14a towards the housing 12. Retention members 14a, 14b include pads 38 thereon in order to provide additional frictional securement to the housing 12, and to prevent damage, such as scratching, to the camera from the retention members 14a, 14b. In the embodiment shown, retention member 14b is able to be secured in place using a fastener 40.

Figure 3A:
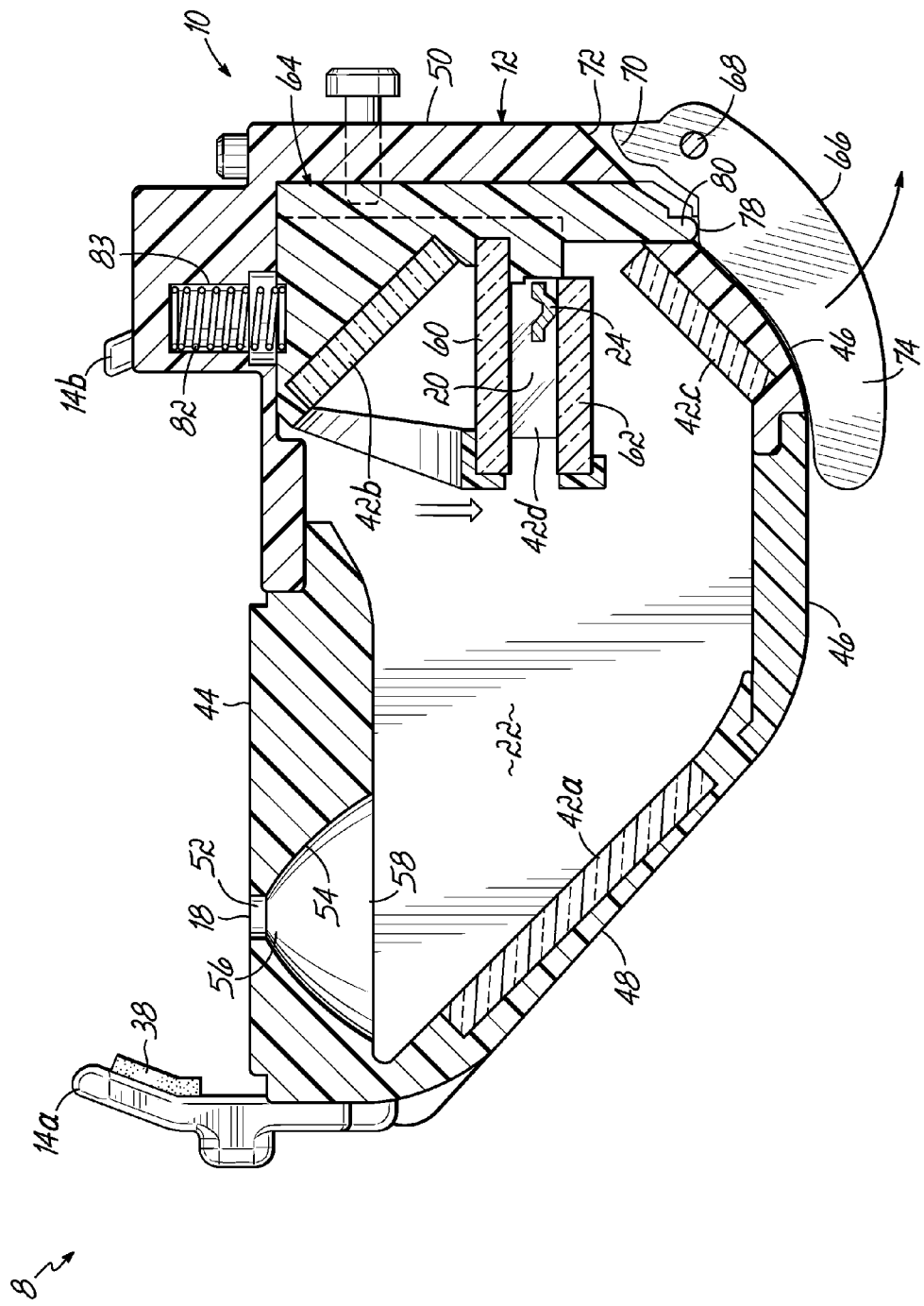
FIG. 3A shows a cross-sectional view of a device of the system of FIG. 1 along line 3-3 of FIG. 1 showing the slot in the open position.
Figure 3B:
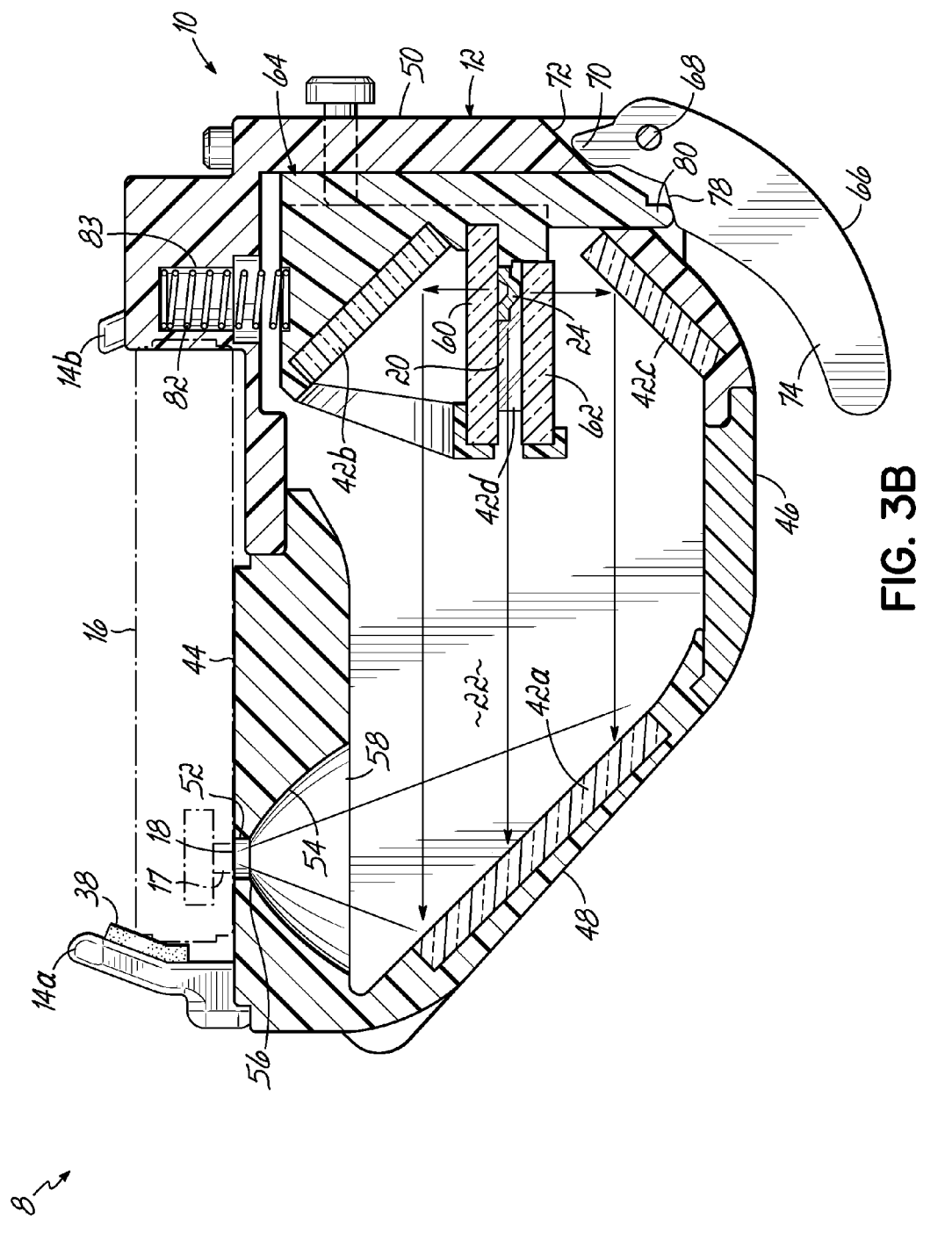
FIG. 3B shows a cross-sectional view of a device of the system of FIG. 1 along line 3-3 of FIG. 1 showing the slot in the closed position.

The housing 12 includes an aperture 18 in communication with the cavity 22 (FIGS. 3A-3B). The lens of the camera may be aligned with the aperture 18 to allow the lens 17 of the camera phone 16 to communicate with the cavity 22, thereby enabling the lens 17 to capture an image of the contents of at least a portion of the cavity 22. The housing 12 further includes a plurality of mirrors 42a, 42b, 42c, 42d (FIGS. 3A-B) in the cavity 22 configured to reflect at least three views of the object towards the camera, thereby allowing the camera to capture an image of the at least three views.

The housing 12 further includes a slot 20 in communication with the cavity 22. As discussed in further detail hereinbelow, the slot 20 may be adjustable for accepting a variety of sizes of objects therein, such as keys 24. The adjustability of the slot 20 may also be provided to secure the objects, such as a key 24, within the slot 20 during use of the system.

With reference to FIGS. 3A and 3B, the device includes a housing 12 having a top, a bottom, and two side portions 44, 46, 48 and 50. The top portion 44 includes an aperture 18 communicating with a cavity 22 within the housing 12. The aperture 18 includes a generally cylindrical portion 52 and a generally frustroconical portion 54. The generally frustroconical portion 54 includes a first end 56 and a second end 58, where the diameter of the second end 58 is greater than the first end 56. The frustroconical portion 54 allows for a greater viewing angle within the cavity 22 of the camera aligned with the aperture 18.

Figure 7:
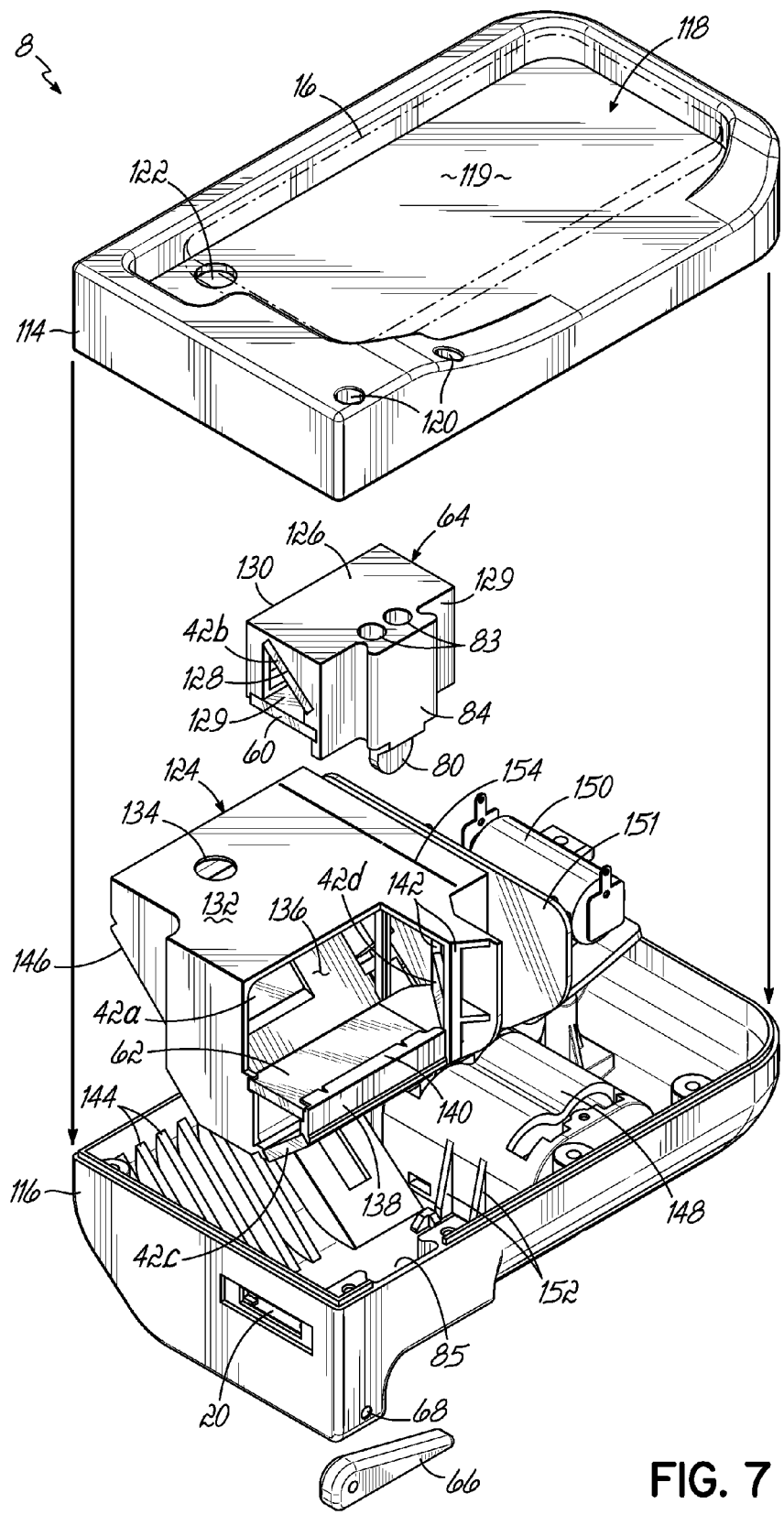
FIG. 7 shows an exploded perspective view the embodiment of FIG. 6 showing internal components.
Figure 8A:
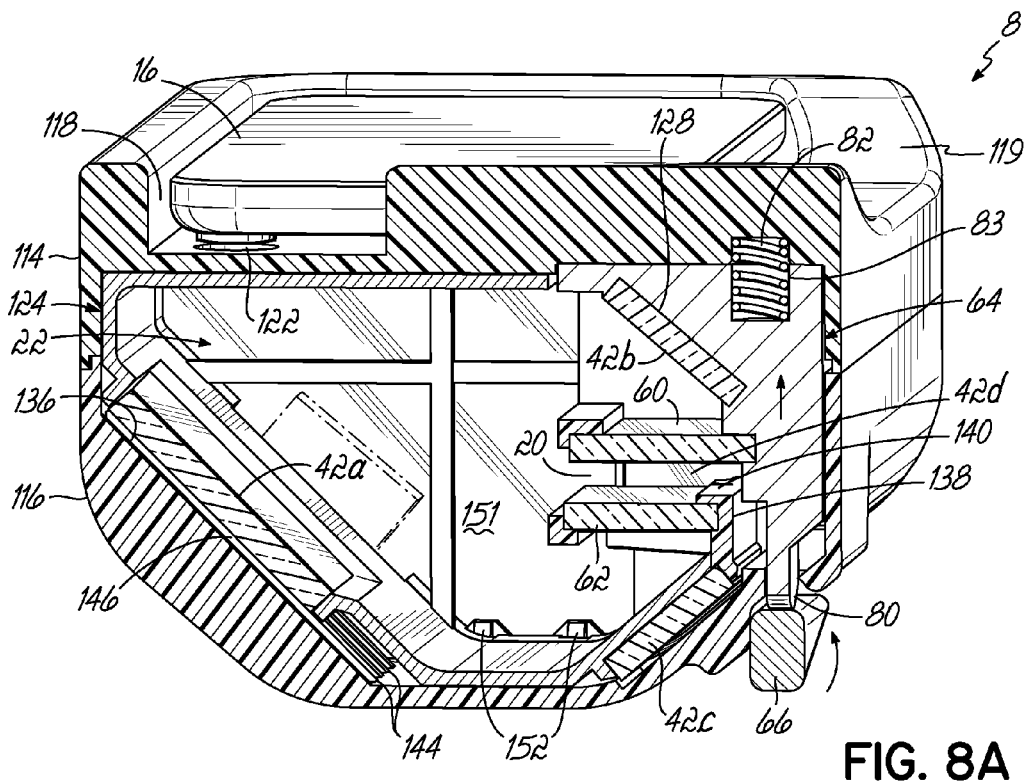
FIG. 8A shows a cross-sectional view of a device of the system of FIG. 6 along line 8-8 of FIG. 6 showing the slot in the open position.
Figure 8B:
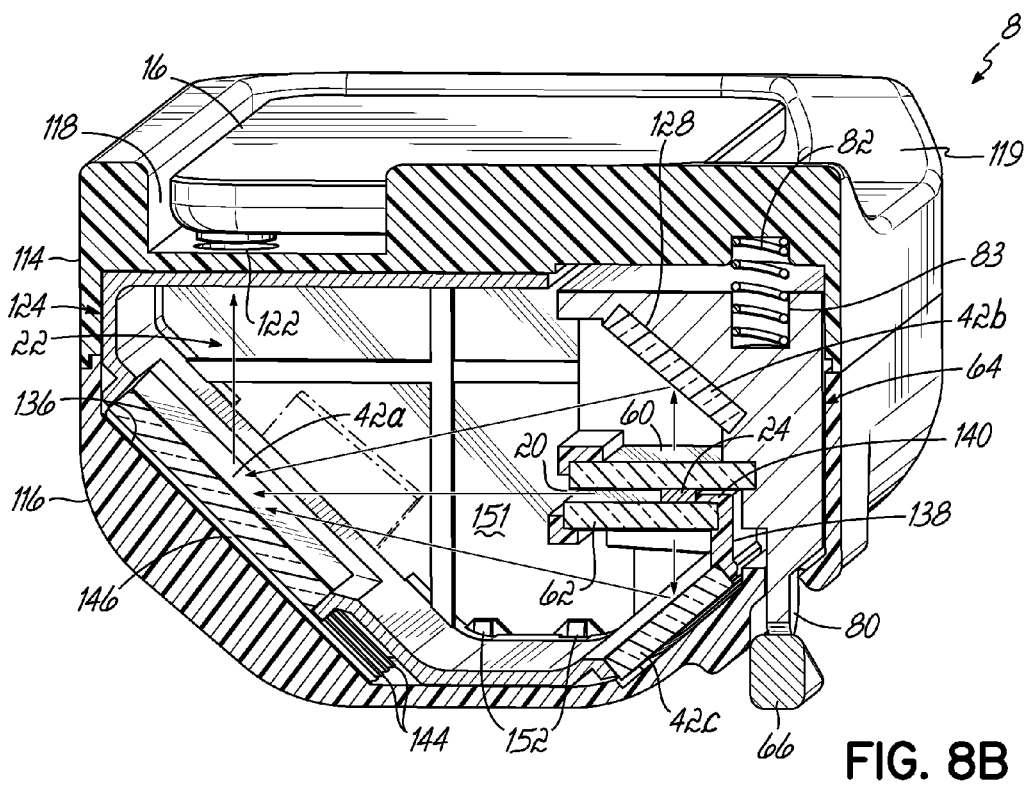
FIG. 8B shows a cross-sectional view of the device of the system of FIG. 6 along line 8-8 of FIG. 6 showing the slot in the closed position.

A slot 20 communicates with the cavity 22. Objects such as keys 24 are received into the slot 20 and thereby also the cavity 22. The slot 20 may be defined as an opening between first and second plates 60, 62. In one embodiment, the first and second plates 60, 62 are glass and include a coating (not shown) in order to provide for ideal lighting characteristics within the housing 12 for camera use. In the embodiment shown in FIGS. 3A and 3B, the first plate 60 is mounted in an adjustable portion 64, which is adjustable in a vertical direction relative to the housing 12. The adjustable portion 64 is moveable between a first, open position (FIG. 3A) and a second, closed position (FIG. 3B). The second plate 62 is fixedly mounted within the housing 12 such that the adjustable portion 64, and thus the first plate 60, is moveable relative to the second plate 62. To move the adjustable portion 64 between the first and second positions, an adjustment lever 66 is provided. The adjustment lever 66 pivots about a member 68 fixed to the housing 12. The rotation of adjustment lever 66 is limited on one side by the interaction of a lateral portion 70 of the lever 66 with a wall 72 of the second side portion 50 of the housing 12. The rotation of adjustment lever 66 is further limited by the arm 74 of the lever 66 interacting with the bottom portion 46 of the housing 12. Adjustment lever 66 includes a flat portion 78 that interacts with a projection 80 of the adjustable portion 64. Further contributing to the upward and downward movement of the adjustable portion 64 is the compression spring 82, which is situated in bore 83 and biased in a downward direction. There may be a second compression spring (not shown) performing the same or similar function. As shown in FIG. 3A, when the adjustment lever 66 is in the first position, the projection 80 of the adjustable portion 64, and thus the entire adjustable portion 64, is unable to move in a downward direction, due to the projection 80 interacting with the flat section 78. As shown in FIG. 3B, the adjustment lever 66 is in the second position and the movement and/or rotation of the flat section 78 is followed by the projection 80 such that the projection 80 moves downward therewith. The downward movement of the projection 80 and thus the adjustable portion 64 is also due to the downward spring bias from the compression spring 82. The adjustable portion 64 includes a dovetailed member 84 which is slidably received into a dovetailed slot 85 in the wall of the housing 12. The interaction between the dovetailed member 84 and the dovetailed slot 85 (shown in phantom in FIG. 4; FIG. 7) provides the adjustable portion 64 one degree of freedom in the vertical direction. In alternative embodiments, however, the adjustable portion 64 may be movably mounted in a manner which allows for movement thereof in the horizontal direction, or, alternatively, in two or more degrees of freedom.

When the adjustment lever 66 is in the second position and the adjustable portion 64 is in the closed position, the height of slot 20 is thereby decreased. The object, such as a key 24, in the slot 20 may be thereby fixed in the slot 20, depending on the size of the key 24. Depending on the size of the object, such as a key 24, inserted into the slot 20, the adjustment lever 66 may not be moved fully to the second position. For example, if the height of the object is larger than the height of the slot 20 when the adjustable portion 64 is in the closed position, moving the lever 66 to the second position may damage the object and/or the internal components of the system. For example, the first and second plates 60, 62 may comprise glass. Therefore, attempting to move the first plate 60 in a downward direction while it is already contacting the object in the slot 20 may lead to the first and/or second plates 60, 62 breaking or shattering. Because of this potential issue, the pivot member and adjustment lever 66 may be configured to resist the downward bias due to the compression spring 82 to prevent unwanted downward movement.

Figure 4:
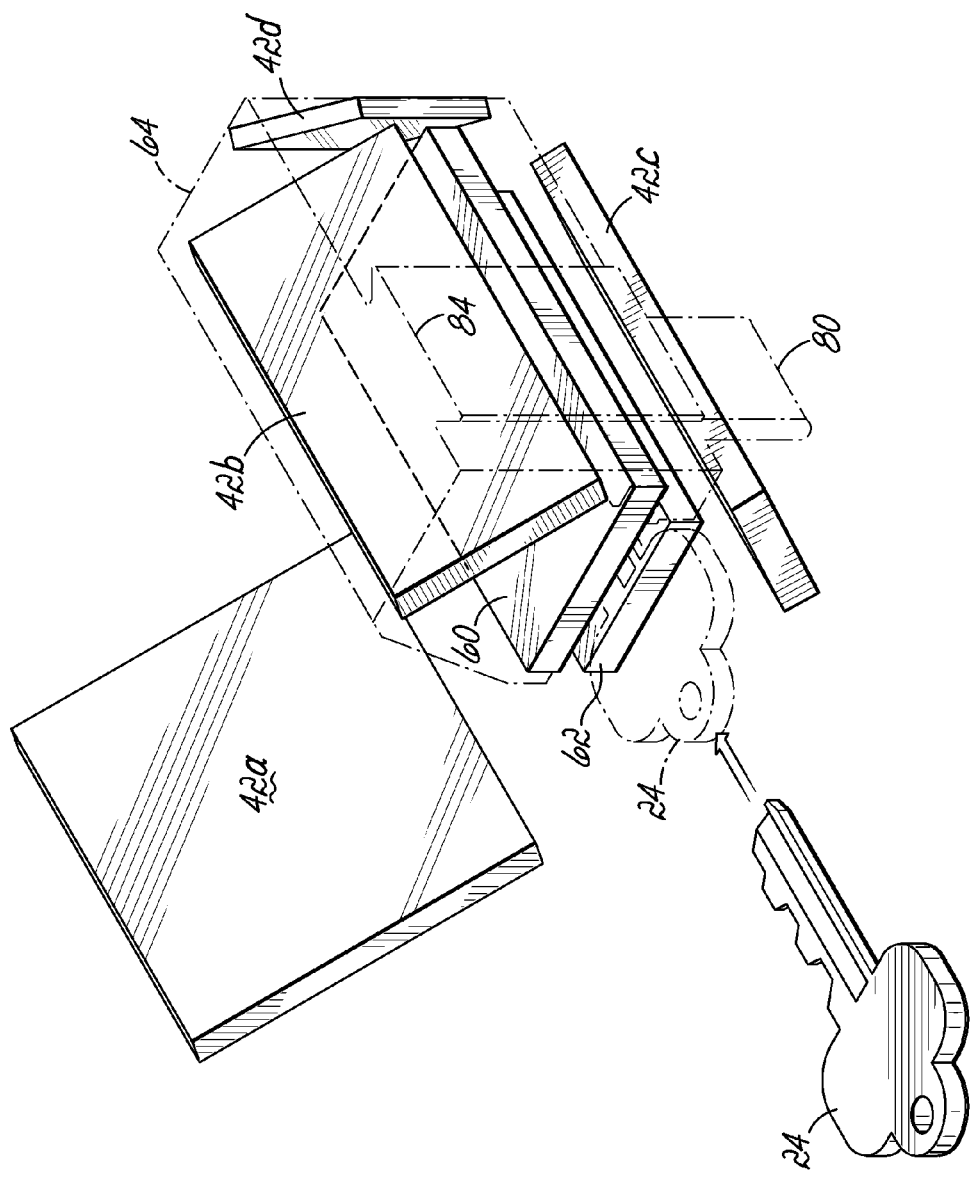
FIG. 4 shows a perspective view of the configuration of the mirrors of FIG. 1.

Also shown in FIGS. 3A and 3B are a plurality of mirrors 42a, 42b, 42c, 42d in the cavity 22 configured to reflect at least three views of the key 24 towards a camera having a lens 17 in alignment with the aperture 18. More specifically, in the embodiment shown in FIGS. 3A and 3B, there are four mirrors 42a, 42b, 42c, 42d in the housing 12 reflecting images of views a key 24. In the embodiment shown in FIGS. 3A and 3B, the object is a key 24, but may be another object such as a credit card. Main mirror 42a reflects an image of the top of the key 24 to the aperture 18. Mirror 42b, which is embedded as a part of the adjustable portion 64, reflects an image of a first side 86 of the key 24 to the main mirror 42a. Mirror 42c reflects a second side view 88 of the key 24 to main mirror 42a. Mirror 42d reflects an end view 92 of the key 24 to main mirror 42a. Main mirror 42a thereby, in effect, re-reflects the images reflected to it from mirrors 42b, 42c and 42d. The mirrors 42a, 42b, 42c, 42d are configured such that the camera will be able to capture each view reflected therefrom. That is, mirrors 42b, 42c and 42d are configured to reflect an image to mirror 42a such that the reflected images do not intersect or interfere with one another. The configuration of the mirrors 42a, 42b, 42c, 42d is shown in FIG. 4. Moreover, mirrors 42a, 42b, 42c, 42d may be first surface mirrors configured to prevent ghosting of the image within the housing 12. Moreover, in at least one embodiment, all or some of the internal components may be white in order to prevent interference with the captured image.

Figure 9:
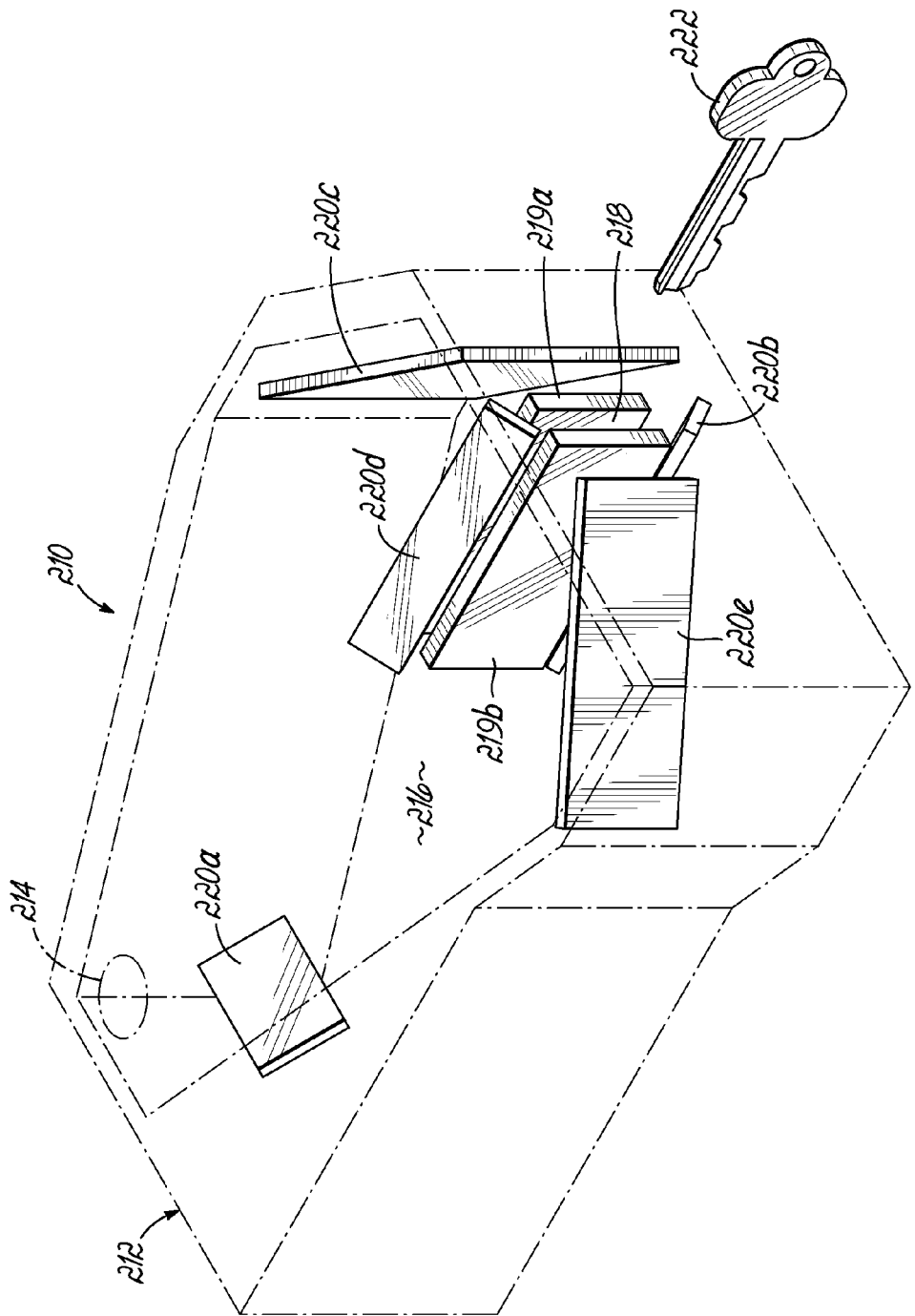
FIG. 9 shows a cross-sectional view of an alternative embodiment of a device which is configured to reflect five views of an object.
Figure 10:
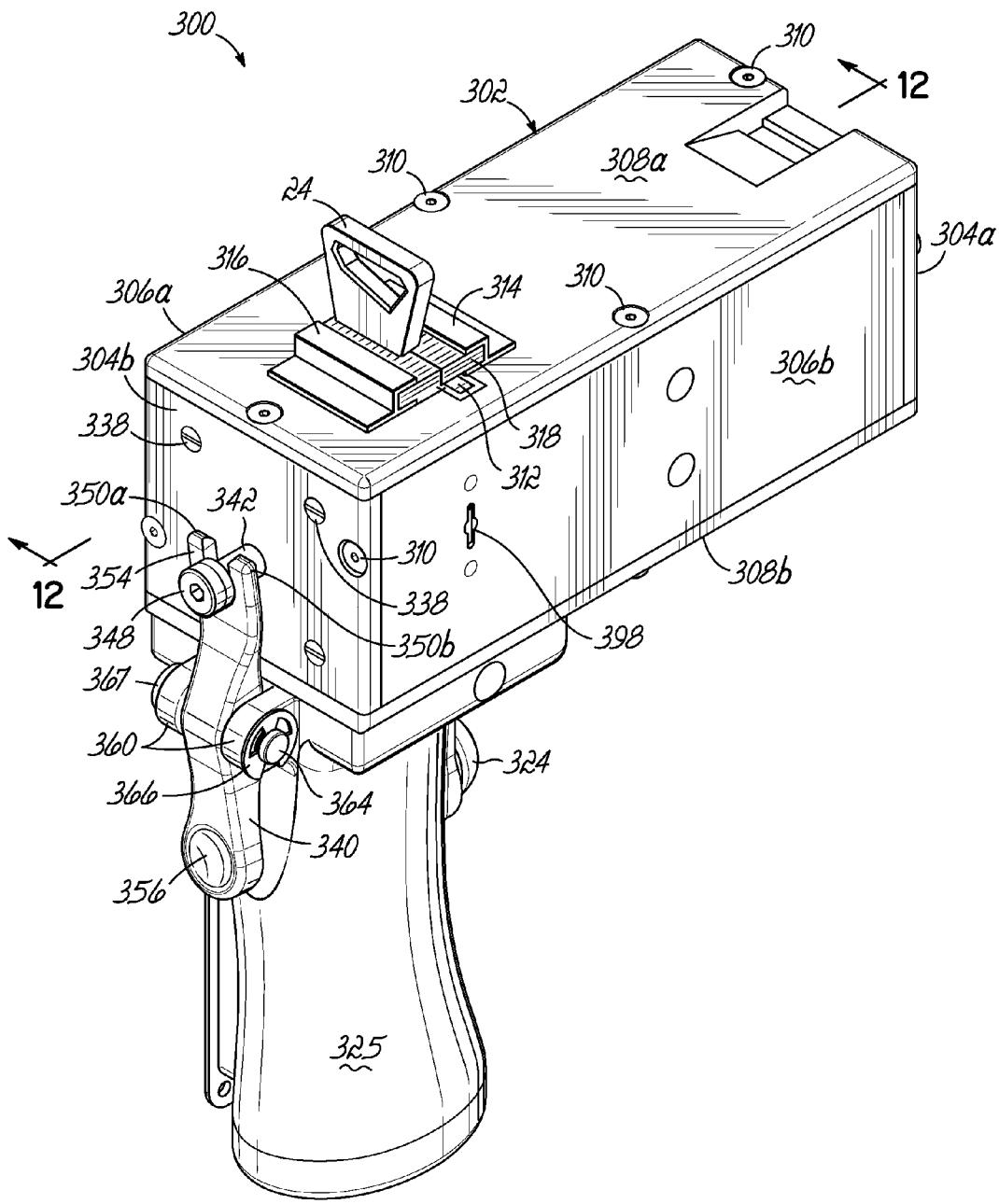
FIG. 10 shows a perspective view of an alternative embodiment of a system capturing multiple views of an object.
Figure 11:
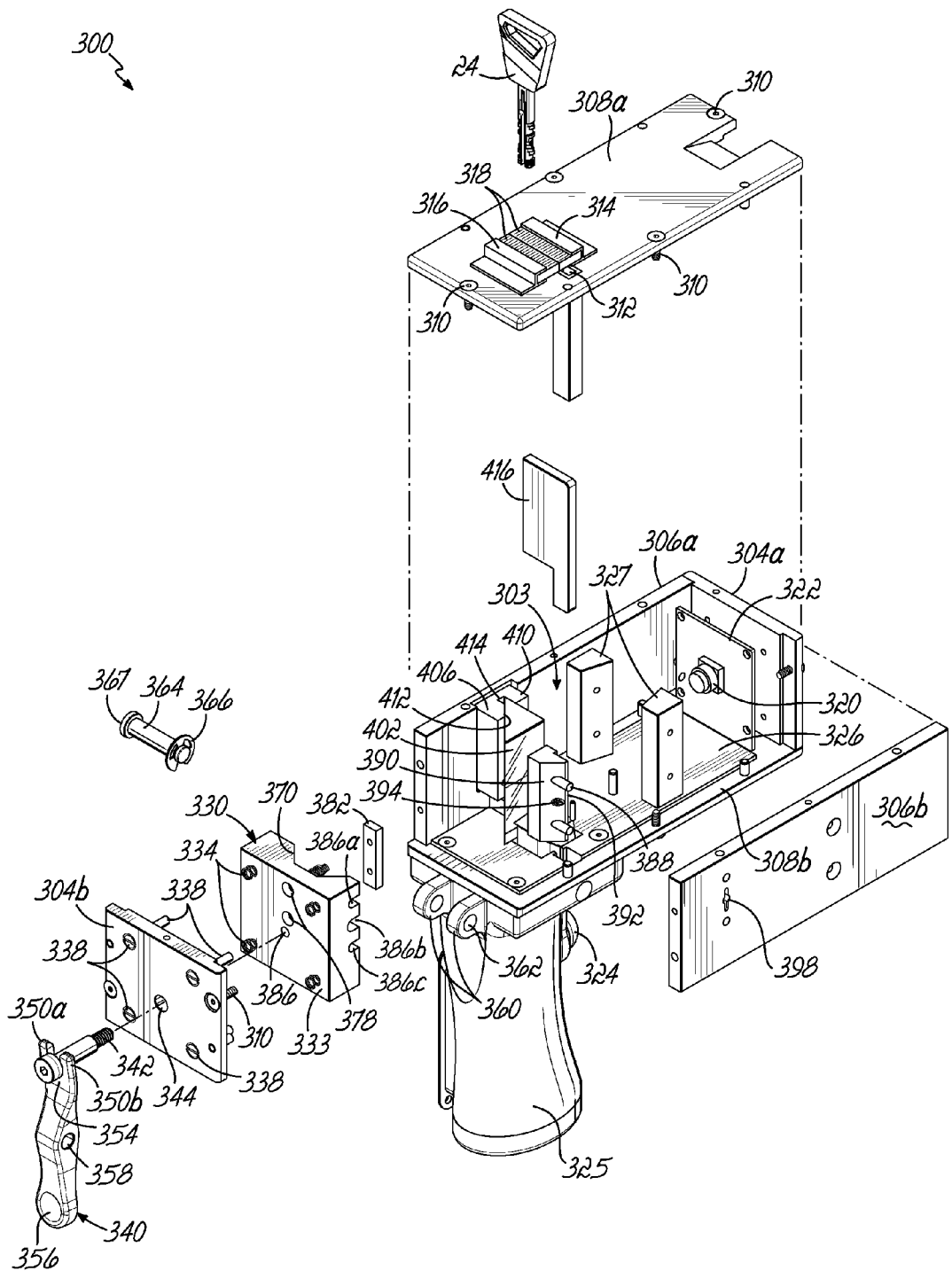
FIG. 11 shows an exploded perspective view of the system of FIG. 10 showing internal components.
Figure 12:
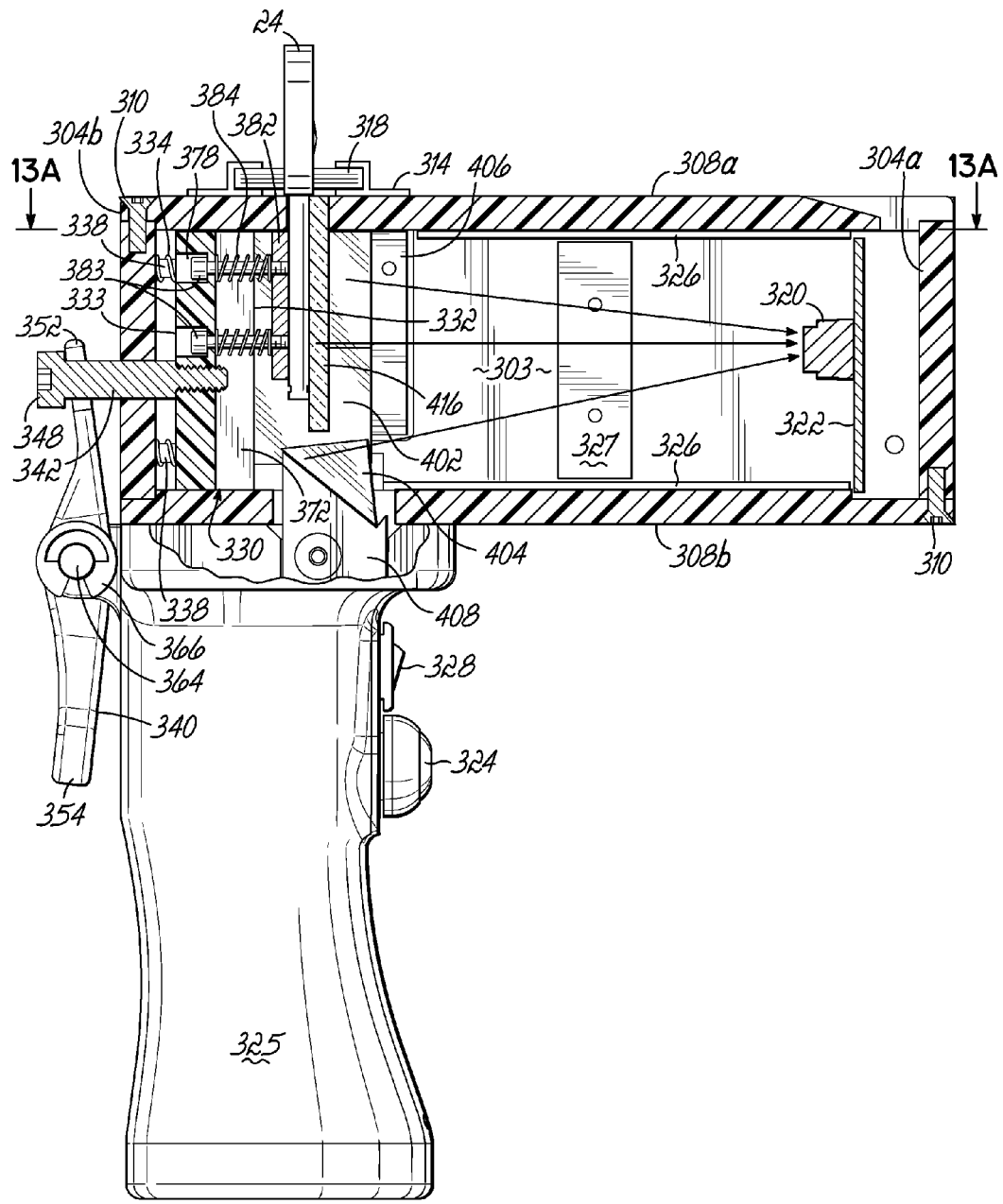
FIG. 12 shows a side cross-sectional view of the system of FIG. 10 along line 12-12 of FIG. 10.

It is appreciated that the views described above depend on the orientation of the object, such as a key 24, inserted into the slot 20. For example, if the key 24 were inserted into the slot 20 in an opposite manner as shown in FIG. 9 such that the bottom of the key 24 was facing downwardly, different views of the key 24 may be reflected by different mirrors. Moreover, as used herein, terms such end, first and second side, and top and bottom are used to describe the views of an object or a key 24. The disclosure herein is not, however, limited to the chosen reference frame and descriptive terms, as the device 10 may be configured to reflect and capture other views of an object or a key 24.

Figure 5:
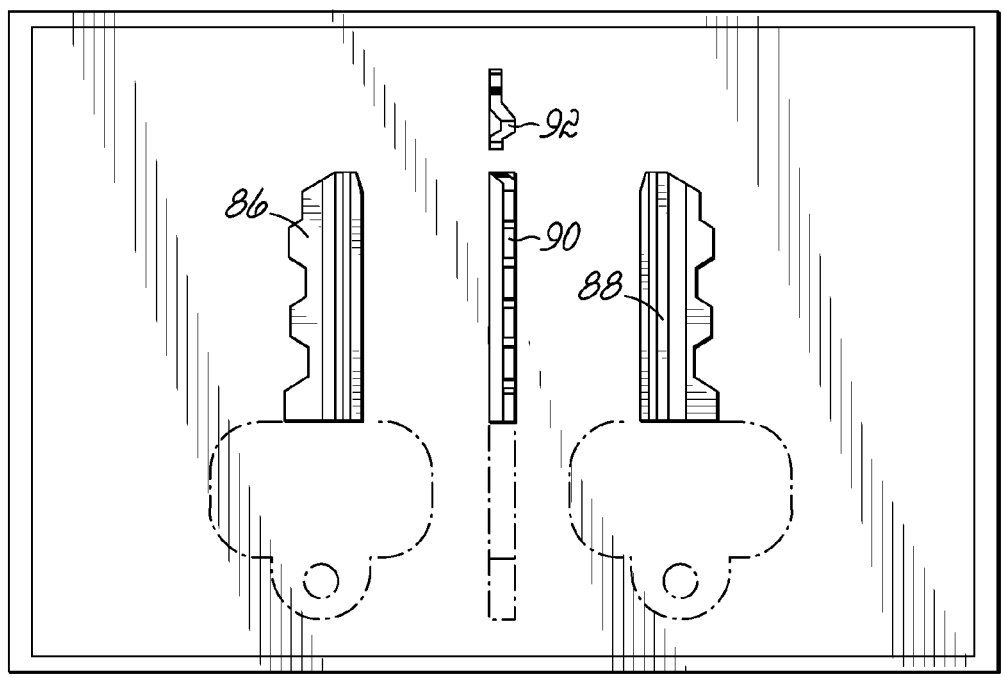
FIG. 5 shows a representation of the views of a key reflected by the mirrors as configured in FIG. 4.
Figure 6:
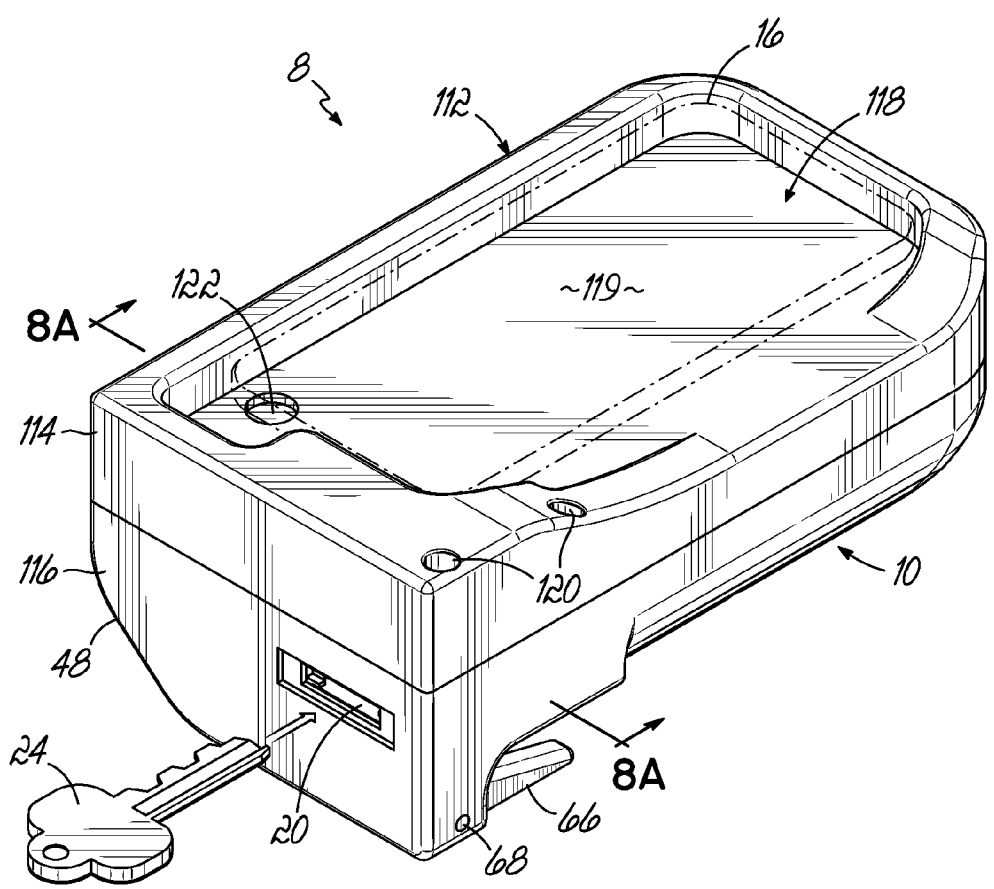
FIG. 6 shows a perspective view of an alternative embodiment of a system for capturing multiple views of an object.

A representation of the full image ultimately reflected from the embodiment in FIGS. 3A and 3B to the aperture 18 and thus captured by the camera is shown in FIG. 5. As discussed above, the reflected image includes first and second side views 86, 88, a top view 90 and an end view 92 of the key 24. The image of the key 24 is then converted by software, for example, into data readable by one or more key manufacturing devices (not shown). Preferably, the data is sent to a first key manufacturing device, which uses the data to produce a key blank. Then, a second manufacturing device (not shown) uses the data to produce a copy of the key 24 from the key blank. In an alternative embodiment, however, there may be one key manufacturing device using the data to produce a copy of the key 24, rather than first and second key manufacturing devices as disclosed above.

An alternative embodiment of the device 10 of the system 8 is shown in FIGS. 6, 7, 8A and 8B. Much of the structure and function of the device 10 is identical or substantially similar to the embodiment shown in FIGS. 1, 2 3A, 3B and 4. The identical or substantially similar components have been marked with the same reference numbers without further discussion below, particularly regarding the functionality of the mirrors 42a, 42b, 42c, 42d and the movement of the slot 20 to and from the open and closed positions. The device 10 includes a housing 112 having upper and lower portions 114, 116. The upper portion 114 includes a recessed portion 118 which is adapted to accept a camera phone 16 (shown in phantom) or other device. The recessed portion 118 further includes a space 119 which may provide a manner for the user to remove the camera phone 16 or other device. "Camera phone," as used herein, may be used to describe a phone which includes a camera, such as a smartphone. "Camera phone" may also be used to refer to portable media players which include cameras and may be adapted for connection to the internet, such as an iPod Touch made by Apple Inc. The upper portion 114 includes a plurality of apertures 120 which accept fasteners (not shown) which are adapted to fix the upper portion 114 relative to the lower portion 116. The upper portion 114 also includes an aperture 122 which allows the lens (not shown) of the camera phone 16 to communicate with a cavity 22 inside of the housing 112. The lower portion 116 includes a slot 20 to accept an object such as a key 24, which is described in more detail below. The slot 20 is adjustable by the lever 66, which is rotatable about point 68.

Referring to FIG. 7, internal to the upper and lower portions 114, 116 are the mirror casing 124 and the adjustable portion 64, which also includes mirrors 42a, 42b, 42c and 42d. As described below, a portion of the mirror casing 124 and the adjustable portion 64 comprise the slot 20. The adjustable portion 64 includes two bores 83 for accepting springs 82 (FIGS. 8A and 8B) which resiliently bias the adjustable portion 64 in the downward direction. The adjustable portion 64 includes a side wall 129 having a dovetailed member 84 which interacts with the dovetailed slot 85 in the upper and lower portions 114, 116 of the housing 112 (not shown in upper portion 114) in order to prevent the movement thereof in the horizontal direction.

On the side of the adjustable portion 64 opposing the dovetailed member 84, there is a generally rectangular aperture 128 in opposing side wall 130 which allows mirror 42b to communicate with mirror 42a. Mirror 42b is situated transversely to the top face 126 and side wall 129 of the mirror casing 124 and is fixed above the aperture 129 above the first plate 60. The adjustable portion 64 includes a projection 80 which interacts with the lever 66 in order to move the adjustable portion 64.

The device 10 further includes a mirror casing 124 configured to be placed inside of the housing 112 between the upper and lower portions 114, 116. The top face 132 of the mirror casing 124 includes an aperture 134 which may be situated concentrically with respect to the aperture 122 in the upper portion 114 of the housing 112 in order for the lens (not shown) of the camera phone 16 to be in communication with the cavity 22 (best shown in FIGS. 8A and 8B).

The mirror casing 124 includes mirrors 42a, 42c and 42d fixed thereon. More specifically, mirror 42a is fixed to support surface 136 in a mechanical manner, such as by an adhesive. Second plate 62 and mirror 42c are fixed to the mirror housing 112 by a holding member 138, which includes a plurality of flanges 140 enveloping a portion of the second plate 62 and mirror 42c. The second plate 62 may be essentially sandwiched between the support surface 136 and the holding member 138. Similarly, mirror 42c may be sandwiched between the holding member 138 and the bottom portion of the mirror casing 124. Mirror 42d may be fit between two retention members 142 in the mirror casing 124, thereby fixing mirror 42d within the mirror casing 124.

Inside of the lower portion 116 of the housing 112 there is a plurality of support beams 144 which support the angled surface 146 of the mirror casing 124 when the mirror casing 124 is directed into the lower portion 116. Inside of the housing 112 is a battery housing 148 which is configured to accept one or more batteries for powering circuit board 151, which includes at least one illumination device (not shown), such as an electroluminous film or a plurality of light emitting diodes. The illumination device, however, is not limited to electroluminous film or LEDs and may be another type of device known to persons skilled in the art. There is a pair of supports 152 configured to receive the circuit board and illumination device. There may be diffusion film (not shown) in the slot 154. The diffusion film may be provided to reduce hot spots, shadows, and control glare from the circuit board mounted illumination devices to obtain the best view of the captured image.

Another alternative embodiment is shown in FIG. 9. The device 210 includes a housing 212 (shown in hidden lines) having a cavity 216 therein and an aperture 214 in communication with the cavity 216. A lens of a camera (not shown) may be aligned with the aperture 214 to allow the lens of the camera to communicate with the cavity 22, thereby enabling the lens to capture an image of the contents of at least a portion of the cavity 22. The device further includes a slot 218 for accepting a key 24 or other object. In the embodiment shown, the slot 218 may be between first and second plates 219a, 219b. As in other disclosed embodiments, the slot 218 may be adjustable to accept varying sizes of keys 24 and to secure the key 24 once directed therein. The housing 212 further includes a plurality of mirrors 220a, 220b, 220c, 220d, 220e in the cavity 22 configured to reflect five views of the key 24 towards the camera, thereby allowing the camera to capture an image of the five views of the key 24. When at least part of the key 24 is directed into the slot 218, the mirrors 220a, 220b, 220c, 220d, 220e are configured to reflect five views of the key 24 to the aperture and thus, the camera lens.

With the key 24 inserted in the configuration as shown in FIG. 9, mirror 220a reflects an image of the end view of the key to the aperture. Mirror 220b reflects the top view of the key to mirror 220c, which reflects the top view image to mirror 220a. Mirror 220c reflects an image of the first side view 86 to mirror 220a. Mirror 220d reflects the bottom view of the key to mirror 220c, which then reflects the bottom view to mirror 220a. Mirror 220e reflects the second side view to mirror 220a. Main mirror 220a then, in effect, re-reflects each of the views reflected to it from mirrors 220b, 220c, 220d, 220e, towards the aperture 214, and thus the camera lens (not shown). The mirrors 220a, 220b, 220c, 220d, 220e are configured such that the camera will be able to capture each view reflected from the mirrors 220a, 220b, 220c, 220d, 220e. More specifically, mirrors 220b, 220c, 220d, 220e are configured to reflect each view to mirror 220a such that the reflected images do not intersect or interfere with one another. Thus, the camera can capture one image comprising the views disclosed above. Preferably, mirrors 220a, 220b, 220c, 220d, 220e are first surface mirrors configured to prevent ghosting of the image within the housing.

FIGS. 10, 11, 12, 13A and 13B show an alternative embodiment of a system 300 for capturing multiple views of an object, such as a key 24. In this embodiment, the system 300 includes housing 302, which is of a generally rectangular shape having front and rear walls 304a, 304b, side walls 306a, 306b, and top and bottom walls 308a, 308b fixed together by fasteners 310 (FIG. 12) such as screws, with a cavity 303 defined by each of the walls 304a, 304b, 306a, 306b, 308a, 308b. The housing 302 includes a slot 312 configured to accept objects, such as keys. The housing 302 includes a slot 312 which is adapted to accept a portion of the key 24. The key 24 may be directed into the slot 312 when the slot 312 is moved to and from a closed position (FIG. 3B) and an open position (FIG. 3A), as described in more detail hereinbelow. To this end, the slot 312 includes a stationary portion 314 and a movable portion 316. In one embodiment, the slot 312 is at least partially covered with bristles 318. In one embodiment, the bristles 318 are plastic but may be another material, such as metal, in an alternative embodiment. The key 24 is secured in the slot 312 when the slot 312 is in the closed position.

The system also includes a camera 320 operably coupled to a circuit board 322 for capturing images of a plurality of views of an object, such as a key 24, directed into the housing 302, which is discussed in more detail hereinbelow. The device further includes a storage device (not shown), such as a secure digital (SD) card reader for accepting an SD card for storing photographs, as understood by those skilled in the art. The camera 320 is operably coupled to push button 324 on handle 325. More specifically, depression of the push button 324 may operate the shutter of the camera 320, thereby enabling the camera 320 to capture an image within the housing 302.

The system also includes a light source in the housing 302. The light source may be electroluminous film 326 on the inner side of at least one of the walls, as shown in FIGS. 10, 11, 12, 13A and 13B. Preferably, there is electroluminous film 326 on the inner sides of the top and bottom walls 308a, 308b. There may be supports 327 in order to provide support for the electroluminous films 326. The rocker switch 328 on handle 325 is operably coupled to the electroluminous films 326 and is operable to turn the electroluminous film 326 to and from the "on" position, wherein the film 326 is illuminated. It is appreciated that the rocker switch 328 and the push button 324 are only one manner of operating the light source and the camera 320. For example, in an alternative embodiment, there may be one button controlling both the light source and the camera 320 essentially simultaneously. Furthermore, in an alternative embodiment, the light source may be a source other than electroluminous film 326.

The housing 302 also includes a main slide 330 therein. The rear wall 332 of main slide 330 includes a plurality of springs 334 mounted thereon and a plurality of apertures 336 extending therethrough from the rear end 332 to the front wall 333. Preferably, springs 334 are compression springs. The apertures 336 are preferably oriented concentrically relative to the springs 334. Each aperture 336 receives one of pins 338 extending through and frontwardly from the rear wall 332.

The main slide 330 is coupled to a lever 340 positioned outside of the housing 302 rearwardly of the rear wall 332 of main slide 330 by an engagement pin 342, which traverses an aperture 344 in the back wall 304 and threadably engages a threaded aperture 346 on a rear side of the main slide 330. The head 348 of engagement pin 342 engages the first and second edges 350a, 350b of the lever slot 352 at a first end 354 of the lever 340. In between the first and second ends 354, 356 of the lever 340 is a lever aperture 358. The handle 325 includes opposed mounting tabs 360 for rotatably mounting the lever 340 relative to the handle 325. Each mounting tab 360 includes concentrically oriented apertures 362. To rotatably mount the lever 340 on the handle 325, the lever aperture 358 is positioned concentrically relative to the apertures 362 of the mounting tabs 360 and the rotation pin 364 is directed through each of the apertures 362 until abutment 367 contacts the corresponding mounting tab 360. Clip 366 is then positioned on the end opposite the abutment 367 to prevent the undesired removal of the rotation pin 364 from the apertures 362.

The front end 333 of the main slide 330 includes an essentially trapezoidal recess 370 having first and second angled portions 372, 374. In between the first and second angled portions 372, 374 is a flat portion 376, which is essentially parallel to the rear end 332 of the main slide 330. The main slide 330 includes a plurality of apertures 378 extending from the back end 333 thereof and through to the flat portion 376. The apertures 378 each receive threaded rods 379, which threadably engage with threaded apertures 380 of a back plate 382. Between the back plate 382 and the flat portion 376 is a pair of compression springs 384 that, when in the compressed state, bias pins 383 and the back plate 382 in the frontward direction.

The main slide 330 includes a plurality of grooves 386a, 386b, 386c. Grooves 386a, 386c interact with the pegs 388a, 388b extending from the angled surface 390 of the secondary slide 392 in order to limit the movement of the main slide 330 in the direction of the front wall 304a. The secondary slide 392 includes a recess 394 between the pegs 388 accepting one end of a spring (not shown). The other end of the spring extends to an elongate aperture 398 in the side wall 306b. A latch pin (not shown) is coupled to the second end of the spring. The latch pin interacts with the elongate aperture 398 and couples the secondary slide 392 with the side wall 306b. Due to the spring, the secondary slide 392 is biased towards the side wall 306b.

The system 300 further includes first and second prisms 402, 404 operable to reflect a plurality of views of the key 24 directed into the housing 302 towards a camera 320 in the housing 302, which is described in more detail hereinbelow. The first and second prisms 402, 404 in one embodiment, are more specifically shaped as right-triangular prisms. The first prism 402 is fixed within the housing 302 by a first prism support 406.

The first prism support 406 is situated in a recess 410 of the side wall 306a, while the second prism support 408 extends in an upward direction from the bottom wall 308b. The first prism support 406 includes an angled section 412 engaging the hypotenuse edge of the first prism 402 and the edge adjacent the first acutely angled corner. The first acutely angled corner of the first prism 402 is accepted into a rectangular recess 414 of the first prism support 406. The first and second prism supports 406, 408 thereby prevent the unwanted movement of the prisms 402, 404 relative to the housing 302.

Figure 13A:
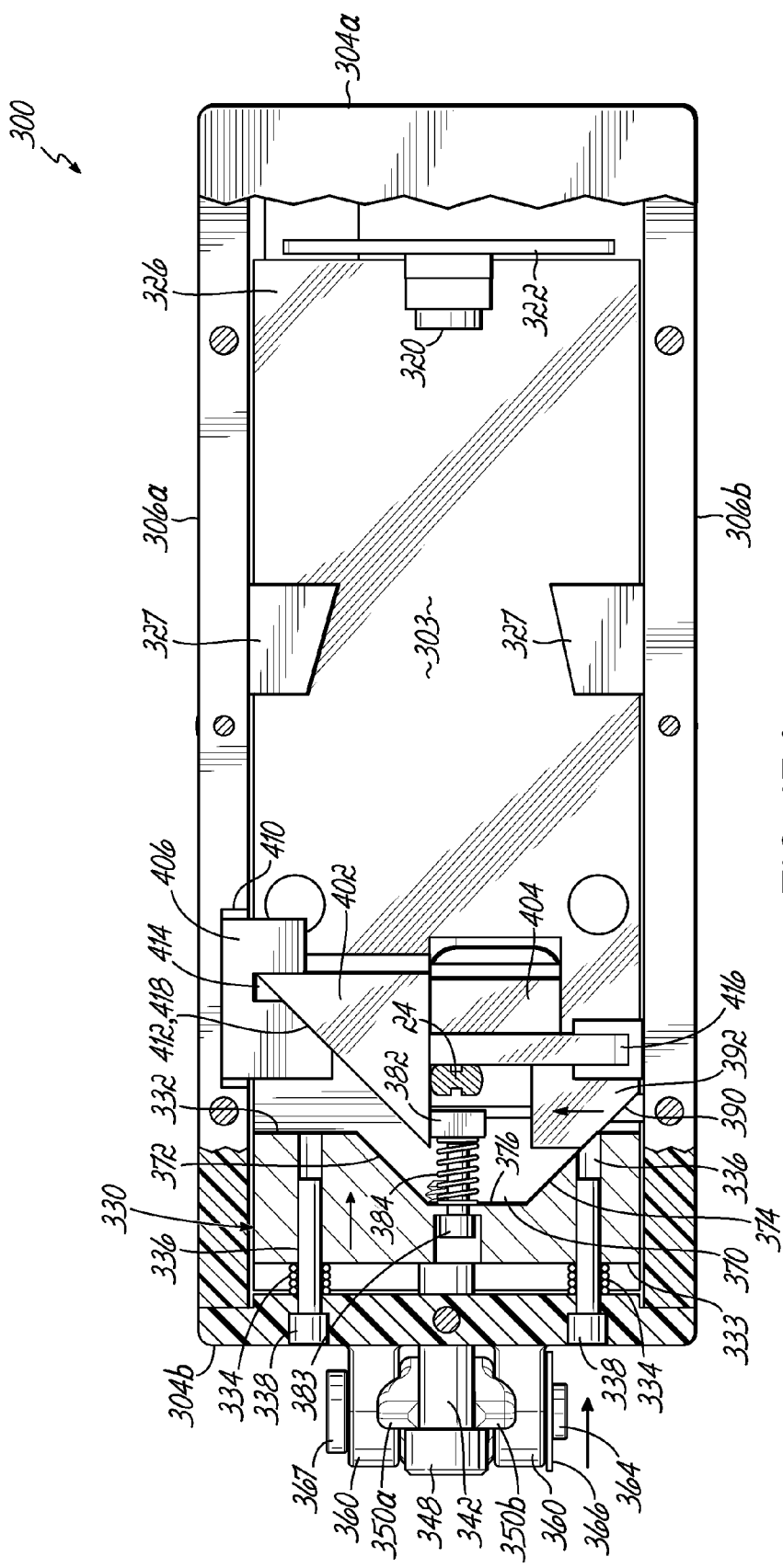
FIG. 13A shows a top cross-sectional view of the system of FIG. 10 along line 13-13 of FIG. 12, showing the slot in the open position.
Figure 13B:
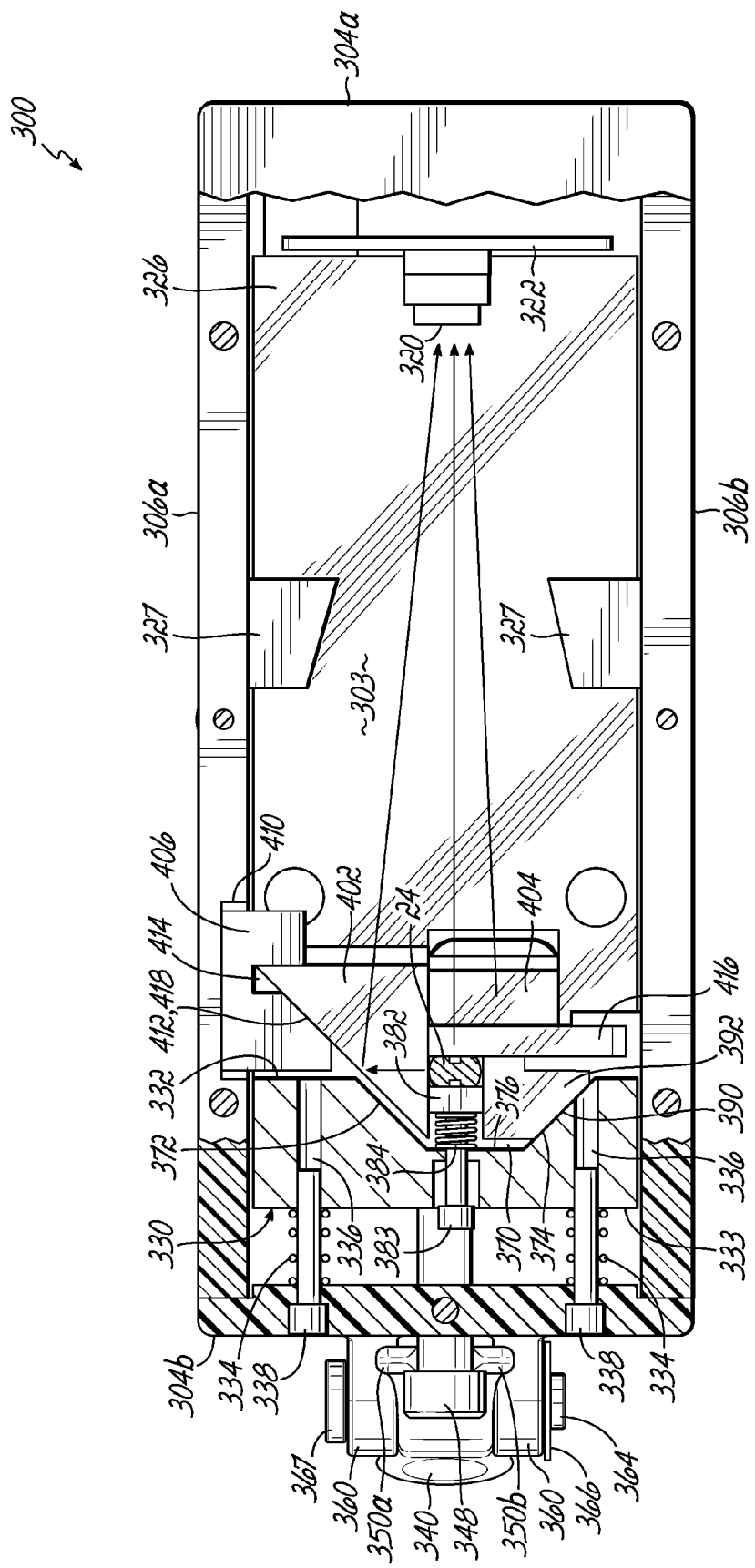
FIG. 13B shows a top cross-sectional view of the system of FIG. 10 along line 13-13 of FIG. 12, showing the slot in the closed position.

Once directed into the slot 312, the key 24 is essentially enveloped by several components within the housing 302. As shown in FIGS. 13A-B, the key 24 is essentially surrounded by the back plate 382, first prism 402, secondary slide 392, and the pressing plate 416, thereby essentially defining an adjustable slot 312 which accepts the key 24 therein. The slot 312 includes an opening in the top wall 308, covered by a plurality of bristle wires 318.

More specifically, when the main slide 330 is in the first position, the slot 312 is in the open position (FIG. 13A). When the main slide 330 is in the second position, the slot 312 is in the closed position (FIG. 13B). More specifically, the first and second sides of the key 24 are abutted by the pressing plate 416 and the back plate 382, respectively, while the top edge and bottom edge of the key 24 are abutted by the secondary slide 392 and the first prism 402.

In order to move the main slide 330 from the first position to the second position, a user depresses the second end 356 of the lever 340 in a direction generally towards the front of the housing 302. Due to the lever 340 being rotatably coupled at the lever aperture 358, the first end 354 thereby moves in the direction opposite of the second end 356 of the lever 340, or in a direction away from the housing 302. The movement of the first end of the lever 340 carries the engagement pin 342 in the same direction. Because the engagement pin 342 is coupled to the main slide 330 as described hereinabove, the movement of engagement pin 342 thereby slidably moves the main slide 330 in the same direction. As the main slide 330 moves rearwardly to the second position, pins 338 remain stationary but are received further into the apertures 336 of the main slide 330. Due to the presence of springs 334 between the main slide 330 and the back wall, as the main slide 330 moves closer towards the back wall 304b, the springs 334 become compressed. The compression of the springs 334 thereby biases the main slide 330 towards the front wall 304a.

As the main slide 330 moves rearwardly to the second position, the spring 396 biasing the secondary slide 392 towards side wall 306b urges the secondary slide 392 in a direction towards the side wall 306b. Due to the interaction of the second angled surface 374 of the main slide 330 and the angled surface 390 of the secondary slide 392, and the spring bias on the secondary slide 392 towards side wall 306b, the secondary slide 392 rides the main slide 330 in a cam-like fashion.

As the main slide 330 moves from the first position to the second position, the back plate 382 also moves in a rearwardly direction. In FIG. 13B, compression springs 384 are compressed and contacting the back plate 382, which in turn contacts the key 24 when the main slide 330 is in the second position. As shown in FIG. 13A, the compression springs 384 are extended and back plate 382 is no longer in contact with the key 24. More specifically, as the main slide 330 moves rearwardly, the pin head 331a of pin 331 in aperture 337 and thus the pin 331 rides along with the main slide 330. Springs 384 eventually reach an extended state, and the back plate 382 moves rearwardly with the pin 331.

The frontward movement of the main slide 330 may be limited in several ways. In the second position, the first angled portion 372 of the main slide 330 may be limited by the hypotenuse portion 418 of the first prism 402. Similarly, the second angled portion 374 of the main slide 330 interacts in a cam-like relationship with the angled portion 390 of the secondary slide 392 and reaches a point where the cam-like relationship no longer allows relative movement therebetween. Furthermore, the pegs 388a, 388b on secondary slide 392 may interact and engage with the first and third grooves 386a, 386c of the main slide 330 to prevent further forward movement thereof. Finally, the back plate 382 may limit the frontward movement of the main slide 330, depending on the properties of the springs 384 and the width of the key 24 directed into the housing 302.

The system 300 is configured to reflect a plurality of views of the key 24 towards the camera 320. More specifically, first prism 402 is configured to reflect the top view towards the camera 320. The second prism 404 is configured to reflect the end view towards the camera 320. The first side view is visible to the camera 320 without being reflected by a mirror or prism. In order to reflect, and thus capture with the camera 320, the bottom and second side views, a user may remove the key 24 and re-insert the key 24 such that the second side view is visible to the camera 320 and the bottom view is reflected by the first prism to the camera 320. The images captured by the camera 320 may then be saved in the data storage device and converted by software, for example, into data readable by one or more key manufacturing devices for producing a copy of the key, as described hereinabove.

While the present invention has been illustrated by a description of various preferred embodiments and while these embodiments have been described in some detail, it is not the intention of the Applicants to restrict or in any way limit the scope of the appended claims to such detail. Additional advantages and modifications will readily appear to those skilled in the art. The various features of the invention may be used alone or in any combination depending on the needs and preferences of the user. This has been a description of the present invention, along with the preferred methods of practicing the present invention as currently known. However, the invention itself should only be defined by the appended claims.

What is claimed is:

1. A device for capturing at least three views of an object with a camera, comprising:
    a housing having a cavity;
    a slot in the housing communicating with the cavity and adapted to accept the object;
    an aperture in the housing adapted to enable a lens of the camera to communicate with the cavity;
    alignment structure on an exterior portion of the housing adapted to align the lens of the camera with the aperture; and
    a plurality of mirrors in the cavity configured to reflect three at least three views of the object towards the camera, thereby allowing the camera to capture a single image of the at least three views, which include first and second side views.

2. The device of claim 1, wherein the alignment structure further comprises at least one retention member adapted to couple the camera adjacent the housing.

3. The device of claim 1, wherein:
    the object is a key; and
    the at least three views comprise four views further comprising the first side view, the second side view, a top view and an end view.

4. The device of claim 3, further comprising a fifth view, wherein the fifth view is a bottom view.

5. The device of claim 1, wherein the device is configured to be portable and hand-held.

6. The device of claim 2, wherein the at least one retention member is adjustable.

7. The device of claim 1, further comprising a light source in the housing.

8. A device for capturing a plurality of views of an object with a camera, comprising:
    a housing having a cavity;
    a plurality of mirrors in the cavity configured to reflect the plurality of views of the object towards the camera, thereby allowing the camera to capture a single image of the plurality of views, which include first and second side views; and
    a slot in the housing communicating with the cavity and adapted to accept the object,
    wherein the housing comprises an adjustable portion containing at least one of the plurality of mirrors and adapted to stabilize the object when at least part of the object is directed into the slot.

9. The device of claim 8, wherein the adjustable portion is adjustable by a lever in order to move the slot between a first, open position and a second, closed position.

10. The device of claim 8, wherein the device is configured to be portable and hand-held.

11. The device of claim 8, wherein the housing further comprises an aperture communicating with the cavity.

12. The device of claim 8, further comprising a retention member adapted to couple the camera adjacent the housing.

13. The device of claim 8, wherein:
    the adjustable portion comprises a first plate of glass; and
    the slot is defined in part by the first plate of glass and a second plate of glass.

14. The device of claim 8, wherein the object is a key.

15. The device of claim 9, wherein a manipulation of the lever causes the adjustable portion to move relative to the housing.

16. The device of claim 12, further comprising an aperture in the housing communicating with the cavity, wherein the retention member is adjustable to align a lens of the camera with the aperture.

17. A system for capturing multiple views of an object, comprising:
    a housing having a cavity;
    a slot in the housing communicating with the cavity and adapted to receive the object;
    a camera having a lens;
    an aperture in the housing to enable the lens of the camera to communicate with the cavity;
    alignment structure on an exterior portion of the housing to align the lens of the camera with the aperture;
    a light source; and
    a plurality of mirrors in the cavity configured to reflect at least three views of the object towards the camera, thereby allowing the camera to capture a single image of the at least three views, which include first and second side views.

18. The system of claim 17, wherein the light source is in the housing.

19. The system of claim 17, wherein the light source is electroluminous film.

20. The system of claim 17, wherein the camera and the light source are in the housing.

21. The system of claim 17, wherein the camera comprises a camera phone.

22. The system of claim 17, wherein the housing further comprises at least one retention member adapted to couple the camera adjacent the housing.

23. The system of claim 17, wherein the housing comprises the aperture communicating with the cavity, thereby allowing the lens of the camera to communicate with the housing when the lens is adjacent the housing.

24. The system of claim 17, further comprising a storage device operative to store the single image captured by the camera.

25. The system of claim 17, wherein:
the object is a key; and
the at least three views comprise four views further comprising the first side view, the second side view, a top view and an end view.

26. The system of claim 17, wherein the housing is portable.

27. The system of claim 21, wherein the camera phone further comprises a storage device operative to store the single image captured by the camera phone.

28. The system of claim 22, wherein the retention member is adjustable to align the lens of the camera with the aperture.

29. The system of claim 27, further comprising:
a manufacturing device; and
software communicating with the storage device and adapted to transform the single image into data, the data readable by the manufacturing device to reproduce the object.

30. The system of claim 29, wherein the object is a key and the data is useable by the manufacturing device to produce a key blank.

31. The system of claim 30, further comprising:
a second manufacturing device, the data usable by the second manufacturing device to reproduce the key from the key blank.

32. A system for capturing multiple views of an object, comprising:
a housing having a cavity;
a slot in the housing communicating with the cavity and adapted to receive the object;
an adjustable portion containing at least one of the plurality of mirrors and adapted to stabilize the object when the object is directed into the slot;
a camera;
a light source; and
a plurality of mirrors in the housing configured to reflect a plurality of views of the object towards the camera, thereby allowing the camera to capture a single image of the plurality of views, which include first and second side views.

33. The system of claim 32, wherein the adjustable portion is adjustable by a lever to move the slot between a first, open position and a second, closed position.

34. The system of claim 32, wherein the camera and the light source are disposed in the housing.

35. The system of claim 32, wherein the camera comprises a camera phone.

36. The system of claim 32, wherein the housing further comprises at least one retention member adapted to couple the camera adjacent the housing.

37. The system of claim 32, wherein the housing comprises an aperture communicating with the cavity.

38. The system of claim 32, further comprising a storage device operative to store the single image captured by the camera.

39. The system of claim 32, wherein:
the adjustable portion comprises a first plate of glass; and
the slot is defined in part by the first plate of glass and a second plate of glass.

40. The system of claim 32, wherein the object is a key.

41. The system of claim 33, wherein a manipulation of the lever moves the adjustable portion relative to the housing.

42. The system of claim 33, wherein the camera phone further comprises a storage device operative to store the single image captured by the camera phone.

43. The system of claim 34, further comprising an aperture in the housing communicating with the cavity, wherein the retention member is adjustable to align a lens of the camera with the aperture.

44. The system of claim 43, further comprising:
a manufacturing device; and
software communicating with the storage device and adapted to transform the single image into data, the data readable by the manufacturing device to reproduce the object.

45. The system of claim 44, wherein the object is a key and the data is useable by the manufacturing device to produce a key blank.

46. The system of claim 45, further comprising:
a second manufacturing device, the data usable by the second manufacturing device to reproduce the key from the key blank.

47. A method of capturing multiple views of an object using a housing comprising a cavity, the cavity including a plurality of mirrors therein, the method comprising:
aligning a lens of a camera to communicate with an aperture in the housing using alignment structure positioned on an exterior portion of the housing;
receiving at least a portion of the object into a slot in the housing communicating with the cavity;
reflecting a single image with the plurality of mirrors towards the camera communicating with the cavity, the single image comprising at least three views of the object, which include first and second side views; and
capturing the single image with the camera.

48. The method of claim 47, further comprising storing the single image.

49. The method of claim 47, wherein the object is a key.

50. The method of claim 47, wherein the alignment structure of the aligning step further comprises at least one adjustable retention member positioned on the housing.

51. The method of claim 49, wherein the capturing and storing steps are performed with a camera phone.

52. The method of claim 49, further comprising:
transforming the single image into data representing the single image using software; and
sending the data to a manufacturing device.

53. The method of claim 49, wherein the object is a key and the method further comprises:
machining a key blank with the data using the manufacturing device.

54. The method of claim 53, further comprising:
machining the key blank to reproduce the key.

55. The method of claim 52, further comprising:
sending the data to a second manufacturing device; and
machining the key blank to reproduce the key with the second manufacturing device.

56. A method of capturing multiple views of an object using a housing comprising a cavity, the cavity including a plurality of mirrors therein, the method comprising:
receiving at least a portion of the object into a slot communicating with the cavity, wherein the slot is formed at least in part by an adjustable portion that includes at least one mirror, the slot being adjustable to stabilize the object in the slot;
reflecting a single image towards a camera with the plurality of mirrors, the single image comprising a plurality of views of the object, which include first and second side views; and capturing the single image with the camera.

57. The method of claim 56, further comprising:

providing a member for adjusting the slot, the member configured to be actuated by a user.

58. The method of claim 57, further comprising storing the single image.

59. The method of claim 57, further comprising detachably receiving the camera adjacent an aperture in the housing.

60. The method of claim 57, wherein the object is a key.

61. The method of claim 58, wherein the capturing and storing steps are performed with a camera phone.

62. The method of claim 56, wherein the detachably receiving step further comprises:

providing a retention member on the housing, the retention member adjustable to align a lens of the camera with the aperture.

63. A method of reproducing a key using a camera phone, comprising:

aligning a lens of the camera phone to communicate with an aperture in a housing of a device using alignment structure positioned on an exterior portion of the housing;

capturing a single image of a plurality of views of the key, which include first and second side views;

transforming the single image into data representing the single image using software in the camera phone;

sending the data to first and second machining devices;

machining a key blank corresponding with the key using the first machining device; and machining the key blank to reproduce a copy of the key with the second machining device.

64. A system for reproducing a key, comprising:

a housing having a cavity;

a slot in the housing communicating with the cavity and adapted to receive at least a portion of the key;

alignment structure located on an exterior of the housing;

a plurality of mirrors in the cavity configured to reflect a plurality of views of the object towards an aperture in the housing, a camera phone, further comprising:

a camera communicating with the aperture operative to capture a single image of the plurality of views, which include first and second side views, a storage device operative to store the single image captured by the camera; and software communicating with storage device and adapted to transform the single image into data representing the single image;

a first key manufacturing device communicating with the camera phone to receive the data, the data useable by the first key manufacturing device to produce a key blank; and a second key manufacturing device communicating the camera phone to receive the data, the data useable by the second key manufacturing device to produce a copy of the key from the key blank.

65. The device of claim 1, wherein the alignment structure further comprises a recessed portion adapted to accept the camera.

66. The system of claim 17, wherein the alignment structure further comprises a recessed portion adapted to accept the camera.

* * * * *

UNITED STATES PATENT AND TRADEMARK OFFICE
CERTIFICATE OF CORRECTION

| | | |
|---|---|---|
| PATENT NO. | : 9,313,383 B2 | Page 1 of 1 |
| APPLICATION NO. | : 13/833313 | |
| DATED | : April 12, 2016 | |
| INVENTOR(S) | : J. Clayton Miller et al. | |

It is certified that error appears in the above-identified patent and that said Letters Patent is hereby corrected as shown below:

Title Page

At (57), line 12, after "image" insert --of at least--.

Specification

Column 1

Line 7, change "object, and" to --object and,--.

Column 2

Line 46, after "communicating" insert --with--.

Column 5

Line 38, after "views" insert --of--.

Claims

Column 11

Claim 1, line 47, first occurrence change "three" to --the--.

Column 16

Claim 64, line 15, after "with" insert --the--.

Claim 64, line 22, after "communicating" insert --with--.

Signed and Sealed this
Nineteenth Day of July, 2016

Michelle K. Lee
*Director of the United States Patent and Trademark Office*